Feb. 14, 1933.   J. L. RUPP   1,897,565

STORAGE BATTERY CONSTRUCTION

Filed Dec. 22, 1928

INVENTOR
John L. Rupp
BY
Raymond N. Van Nest
ATTORNEY

Patented Feb. 14, 1933

1,897,565

UNITED STATES PATENT OFFICE

JOHN L. RUPP, OF EDGEWOOD, PENNSYLVANIA, ASSIGNOR TO WUBCO BATTERY CORPORATION, OF SWISSVALE, PENNSYLVANIA, A CORPORATION OF NEW YORK

STORAGE BATTERY CONSTRUCTION

Application filed December 22, 1928. Serial No. 327,876.

My present invention relates to storage battery construction and more particularly to the construction of the vent plugs.

In certain types of batteries it is desirable that the vent plugs be so arranged that they may be removed and replaced more quickly and with less effort than those heretofore in use. This is especially true, and a considerable saving of time is thereby effected, where storage batteries are employed in large numbers, as in a farm lighting plant.

An object of my invention is to provide a vent plug for storage batteries which may be attached thereto or removed therefrom within a minimum period of time and with a minimum of effort.

A further object of my invention is to provide a vent plug which also will serve as a safety valve and which will eliminate all possibility of the battery cell being damaged by internal pressure of gases which are given off during the charging operation.

Other objects and advantages will be apparent as the description proceeds.

A better understanding of my invention may be had by reference to the accompanying drawing, wherein Figure 1 is a side elevational view of a vent plug embodying one form of my invention.

Figure 1:
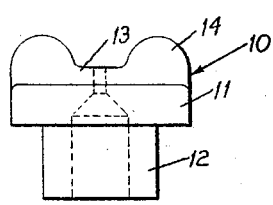
Figure 2:
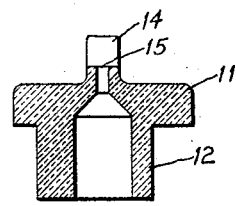
Figure 2 is a central vertical sectional view through Figure 1.
Figure 3:
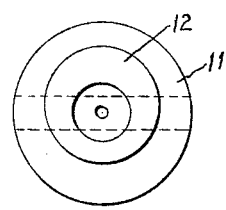
Figure 3 is a bottom plan view thereof.
Figure 4:
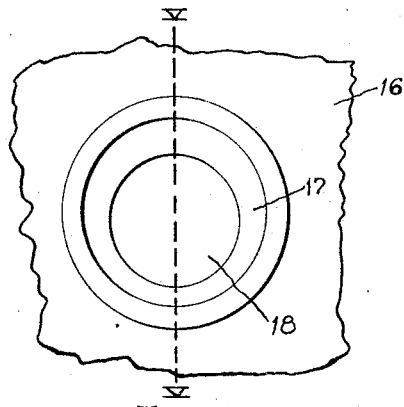
Figure 4 is a fragmentary plan view of a storage battery cover showing the recess into which the vent plug is adapted to fit.
Figure 5:
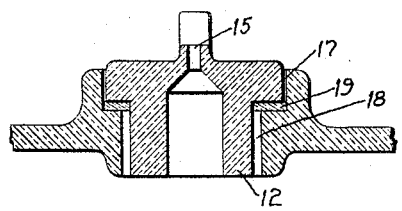
Figure 5 is a sectional view taken on the line V—V of Figure 4.

According to the form of my invention illustrated, reference numeral 10 designates a storage battery vent plug having a top circular portion 11 from which depends a circular skirt 12. Portions 11 and 12 are eccentrically arranged with respect to each other. A finger piece 13 having rests 14, extends upwardly from top portion 11 to facilitate handling of the plug. A vent opening 15 is provided to permit the escape of gases from the cell to the atmosphere.

The cell cover 16 is provided with a recess 17 adapted to receive top portion 11 of the vent plug. A hole 18 extends from the bottom of recess 17 to the interior of the cell. The hole is eccentric to recess 17 and is of slightly larger diameter than skirt portion 12 of plug 10. The parts are so dimensioned that plug 10 may be inserted in the cover opening so that the upper portion 11 and skirt 12 thereof are concentric with recess 17 and hole 18 respectively. A thin soft rubber gasket 19 is placed at the bottom of recess 17, upon which the lower surface of top portion 11 is adapted to rest. The plug may be secured in position by imparting thereto a slight rotating movement and at the same time, holding the plug firmly against gasket 19. The binding action or frictional force between the outer wall of skirt 12 and the inner wall of hole 18 which will be brought into contact at portions of their surfaces due to their eccentricity, will be more than sufficient to hold the plug firmly in position. The downward pressure of the plug upon the gasket 19 will seal the cell against acid seepage. The plug may be removed by grasping the finger-piece 13 and rotating it until skirt 12 is out of contact with cover 16. The distance through which the plug must be rotated to secure it in position or remove it, is obviously but a small fraction of a revolution, and these operations may be performed much more quickly and easily than is the case with the screw-threaded type of vent plug heretofore in use.

A further advantage of my invention is that in the event the small vent opening 15 should become clogged and the escape of gases given off by the electrolyte prevented, the pressure resulting therefrom will overcome the frictional forces holding the plug in position and it will be expelled therefrom, thereby relieving the pressure within the cell. The possibility of the cell, or any property in the vicinity thereof being damaged, is thus entirely eliminated.

What I claim as new and desire to secure by Letters Patent of the United States, is—

1. In combination with a storage battery cover having a recess and a hole eccentric to said recess extending from the bottom thereof to the interior of a storage battery, a vent plug having a top circular portion adapted to fit within said recess, and a portion eccentric thereto adapted to fit within said hole.

2. In combination, a storage battery cover having a recess formed therein and a perforation extending from the bottom of said recess to the interior of a storage battery, said recess and said perforation being eccentric to each other, a resilient gasket in the bottom of said recess, a vent plug having a portion adapted to fit within said recess and bear upon said gasket, and a portion adapted to fit within said perforation and to occupy an initial concentric position with respect to the walls thereof, whereby upon rotating said plug, the wall of said second-named portion will frictionally engage the wall of said perforation to hold the plug in position.

In witness whereof, I have hereunto subscribed my name.

JOHN L. RUPP.